(No Model.)
I. PFORTNER.
SMOKING PIPE.
No. 419,348.            Patented Jan. 14, 1890.
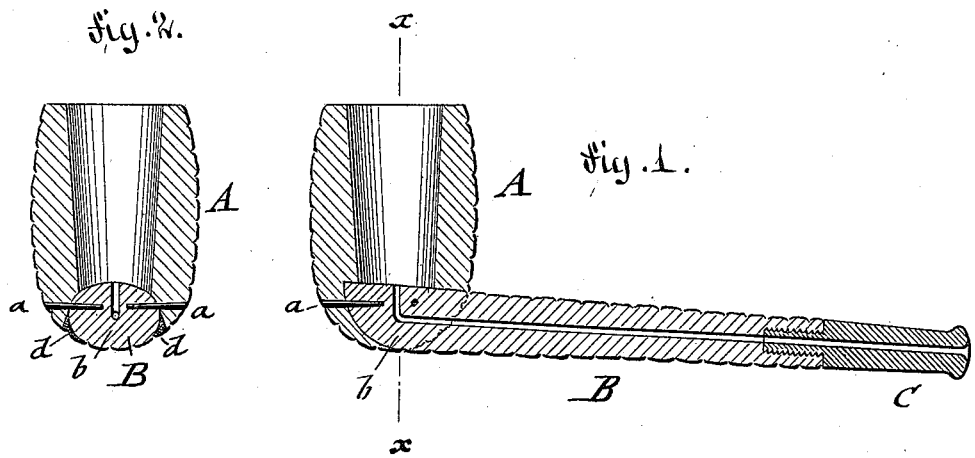
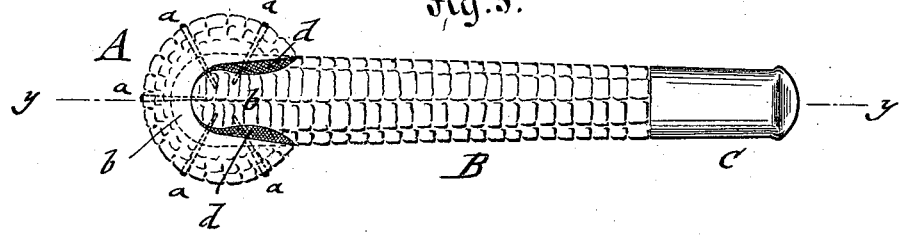
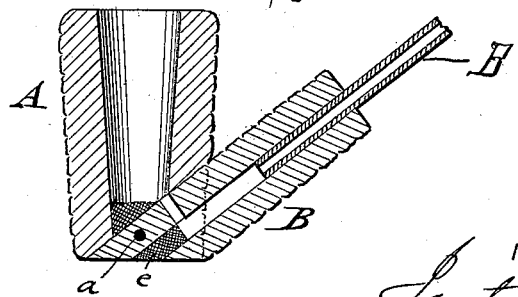
WITNESSES:
INVENTOR
ATTORNEYS.

UNITED STATES PATENT OFFICE.

IGNATZ PFORTNER, OF NEW YORK, N. Y.

SMOKING-PIPE.

SPECIFICATION forming part of Letters Patent No. 419,348, dated January 14, 1890.

Application filed August 1, 1889. Serial No. 319,453. (No model.)

*To all whom it may concern:*

Be it known that I, IGNATZ PFORTNER, of the city, county, and State of New York, a citizen of the United States, have invented certain new and useful Improvements in Smoking-Pipes, of which the following is a specification.

This invention relates to certain improvements in that class of smoking-pipes in which the bowl and stem are made of corn-cob, and thereby a cheap pipe in imitation of a meerchaum pipe is supplied; and the invention consists of a smoking pipe in which the bowl and stem are made of corn-cob, the bottom of the bowl being recessed for the insertion of the stem, which is secured thereto by means of fastening-pins, and by filling up the interstices between the bowl and stem with plaster-of-paris or other suitable cement.
In the accompanying drawings, Figure 1 represents a vertical longitudinal section of my improved smoking-pipe on line $y\ y$, Fig. 3. Fig. 2 is a vertical transverse section of the same on line $x\ x$, Fig. 1. Fig. 3 is a bottom view, and Fig. 4 a vertical longitudinal section, of a modified form of pipe.

Similar letters of reference indicate corresponding parts.

Referring to the drawings, A represents the bowl and B the stem of my improved smoking-pipe, which bowl and stem are both made of corn-cob, which is bored and prepared in the usual manner for this purpose. The end $b$ of the stem B is inserted into a dovetailed bottom recess of the bowl A and secured thereto by means of radial fastening-pins $a\ a$, which are driven through the bottom of the bowl into the stem B, as shown clearly in the drawings. The interstices be-
tween the recessed bottom of the bowl and
the end $b$ of the stem B are filled up with plaster-of-paris or other suitable cement, as shown at $d\ d$ in Figs. 2 and 3. The cement filling $d$ produces the tight connection between the bowl and stem.

The stem B of the pipe shown in Fig. 1 is provided with a mouth-piece C, of horn or other material, which is attached thereto in the usual manner. When the stem B is attached to the bowl at an oblique angle, as shown in Fig. 4, a stem B', of suitable tubular material, is inserted into the stem B, which latter is closed up at the end below the bowl A by a plug $e$, of wood or other suitable material. The bottom of the bowl is filled up with a suitable cement or a plug of corn-cob, as desired.

The connection of the bowl and inclined stem shown in Fig. 4 is made by means of fastening-pins in the same manner as in the pipe shown in Figs. 1, 2, and 3.

Having thus described my invention, I claim as new and desire to secure by Letters Patent—

A smoking-pipe composed of a bowl having a bottom recess, a stem, the end of which is inserted into said recess, radial fastening-pins for securing the stem to the bowl, and a filling of cement inserted into the interstices between the bowl and stem, substantially as set forth.

In testimony that I claim the foregoing as my invention I have signed my name in presence of two subscribing witnesses.

IGNATZ PFORTNER.

Witnesses:
W. REIMHERR,
JOHN ALONZO STRALEY.